(12) United States Patent
Kim

(10) Patent No.: US 9,166,208 B2
(45) Date of Patent: Oct. 20, 2015

(54) RECHARGEABLE BATTERY

(75) Inventor: Dukjung Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 237 days.

(21) Appl. No.: 13/253,290

(22) Filed: Oct. 5, 2011

(65) Prior Publication Data

US 2012/0177983 A1 Jul. 12, 2012

(30) Foreign Application Priority Data

Jan. 12, 2011 (KR) ........................ 10-2011-0003047

(51) Int. Cl.
  *H01M 2/02* (2006.01)
  *H01M 2/04* (2006.01)

(52) U.S. Cl.
  CPC ............ *H01M 2/021* (2013.01); *H01M 2/0473* (2013.01)

(58) Field of Classification Search
  None
  See application file for complete search history.

(56) References Cited

U.S. PATENT DOCUMENTS

| 4,278,742 A | 7/1981 | Oxenreider et al. |
| 2008/0038627 A1 | 2/2008 | Yamauchi et al. |
| 2009/0186269 A1 | 7/2009 | Kim et al. |

FOREIGN PATENT DOCUMENTS

| JP | 2005-294012 | 10/2005 |
| JP | 2006-019089 | 1/2006 |
| JP | 2007-179803 | 7/2007 |
| KR | 10-2003-0081940 A | 10/2003 |
| KR | 10-2006-0118114 A | 11/2006 |
| KR | 10-2009-0081197 A | 7/2009 |
| WO | WO 99/05730 A1 | 2/1999 |

OTHER PUBLICATIONS

European Search Report dated May 9, 2012, for corresponding European Patent application 12150999.6, (6 pages).
Patent Abstracts of Japan, and English machine translation of Japanese Publication 2007-179803, (14 pages.)
KIPO Notice of Allowance dated Dec. 1, 2012, for Korean priority Patent application 10-2011-0003047, (5 pages).
Patent Abstracts of Japan, and English machine translation of Japanese Publication 2006-019089, listed above, (17 pages).
EPO Office action dated Aug. 15, 2014, for corresponding European Patent application 12150999.6, (5 pages).

*Primary Examiner* — Sarah A Slifka
(74) *Attorney, Agent, or Firm* — Christie, Parker & Hale, LLP

(57) ABSTRACT

A rechargeable battery includes an electrode assembly including a first electrode plate, a second electrode plate, and a separator between the first and second electrode plates; a first collector plate and a second collector plate electrically coupled to the first electrode plate and the second electrode plate, respectively; a case accommodating the electrode assembly and the first and second collector plates; and a cap assembly coupled to the case, wherein the cap assembly comprises a cap plate sealing the case, and wherein a reinforcing protrusion part is on the cap plate extending along a length of the cap plate.

7 Claims, 4 Drawing Sheets

RECHARGEABLE BATTERY

CROSS-REFERENCE TO RELATED APPLICATION

This application claims priority to and the benefit of Korean Patent Application No. 10-2011-0003047, filed on Jan. 12, 2011, the entire content of which is incorporated herein by reference.

BACKGROUND

1. Field

The present invention relates to a rechargeable battery.

2. Description of the Related Art

A rechargeable battery may be charged and discharged unlike a primary battery that may not be recharged. A low capacity rechargeable battery that comprises a pack shaped battery cell may be used as a power source for various small portable electronic devices such as cellular phones, laptop computers, and camcorders. A high capacity rechargeable battery that has several tens of the battery cells that are connected may be used as power sources for driving motors such as hybrid automobile.

The rechargeable battery may be fabricated into various shapes including a cylindrical and a rectangular box shape and typically includes an electrode assembly having a positive electrode and a negative electrode and an insulating separator that is between the electrodes and is wound and inserted into a case. The case is mounted with a cap assembly that is formed with an outer terminal to provide a battery.

When a rechargeable battery undergoes deformation due to external forces, internal short-circuits are generated in the rechargeable battery, increasing an internal pressure, resulting in a fire or explosion. Accordingly, there is a need for a rechargeable battery having increased strength.

SUMMARY

Embodiments of the present invention provide a rechargeable battery including a cap plate having improved strength and having improved capacity relative to volume.

According to one embodiment, a rechargeable battery is provided including an electrode assembly including a first electrode plate, a second electrode plate, and a separator between the first and second electrode plates; a first collector plate and a second collector plate electrically coupled to the first electrode plate and the second electrode plate, respectively; a case accommodating the electrode assembly and the first and second collector plates; and a cap assembly coupled to the case, wherein the cap assembly comprises a cap plate sealing the case, and wherein a reinforcing protrusion part is on the cap plate extending along a length of the cap plate.

In one embodiment, the reinforcing protrusion part is stepped from a peripheral surface of the cap plate and a stepped surface forming a lateral surface of the reinforcing protrusion part may be substantially perpendicular to the peripheral surface of the cap plate. In one embodiment, the cap plate includes a receiving groove located opposite to the reinforcing protrusion part. Further, a first electrode terminal may be within a first side of the receiving groove and a second electrode terminal may be within a second side of the receiving groove.

According to another embodiment of the present invention, a rechargeable battery includes an electrode assembly including a first electrode plate, a second electrode plate, and a separator between the first and second electrode plates; a first collector plate and a second collector plate electrically coupled to the first electrode plate and the second electrode plate, respectively; a case accommodating the electrode assembly and the first and second collector plates; and a cap assembly coupled to the case, wherein the cap assembly comprises a cap plate sealing the case, and wherein first and second reinforcing protrusion parts on a surface of the cap plate.

As described above, in the rechargeable battery according to the present invention, since the strength of the cap plate is improved, safety during use of the rechargeable battery can be improved. In addition, the rechargeable battery according to the present invention can improve the capacity relative to volume.

Additional aspects and/or advantages of the invention will be set forth in part in the description which follows.

BRIEF DESCRIPTION OF THE DRAWINGS

The objects, features and advantages of the present invention will be more apparent from the following detailed description in conjunction with the accompanying drawings, in which.

DETAILED DESCRIPTION

Hereinafter, embodiments of the present invention will be described in detail with reference to the accompanying drawings.

Figure 1:
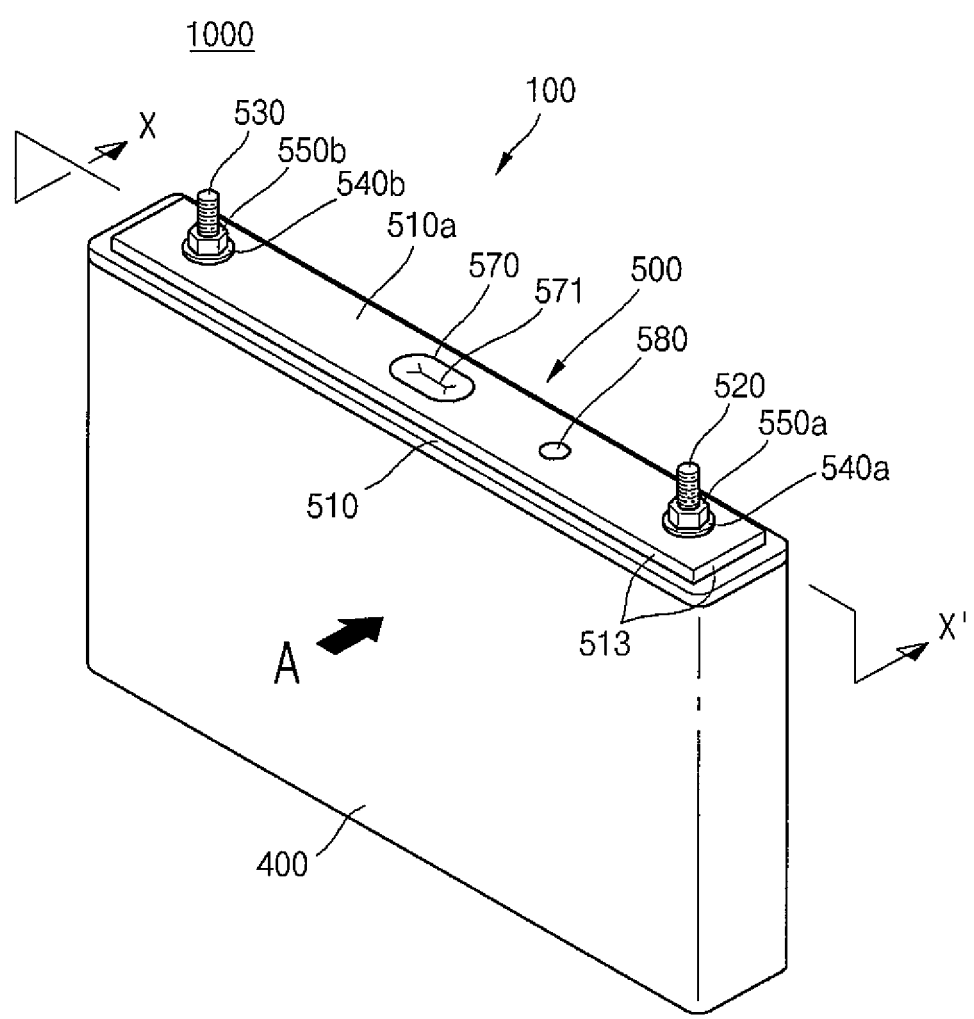
FIG. 1 is a perspective view of a rechargeable battery according to an embodiment of the present invention.
Figure 2:
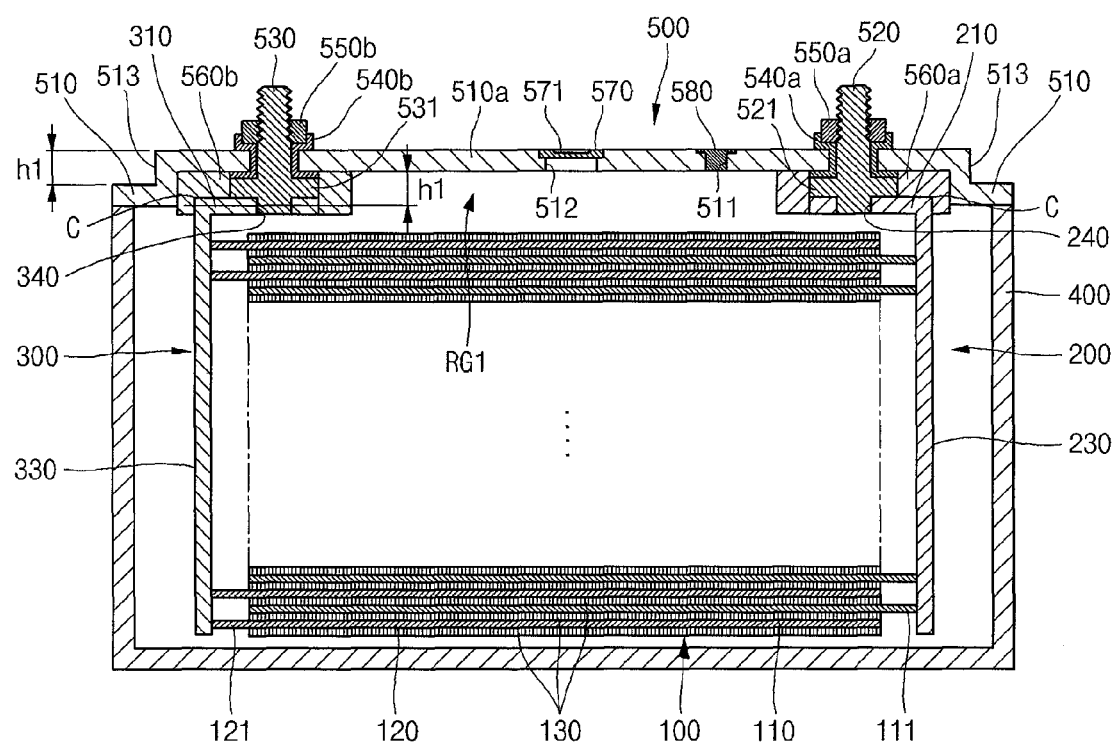
FIG. 2 is a cross-sectional view of the rechargeable battery shown in FIG. 1, taken along the line X-X' in the direction 'A' of FIG. 1.

FIG. 1 is a perspective view of a rechargeable battery according to an embodiment of the present invention, and FIG. 2 is a cross-sectional view of the rechargeable battery shown in FIG. 1, taken along the line X-X' in the direction 'A' of FIG. 1.

Referring to FIGS. 1 and 2, the rechargeable battery 1000 according to the illustrated embodiment of the present invention includes an electrode assembly 100, a first collector plate 200, a third collector plate 300, a case 400, and a cap assembly 500.

The electrode assembly 100 includes a first electrode plate 110, second electrode plate 120 and a separator 130, each made of a thin plate or film.

The first electrode plate 110 is formed by coating a first electrode active material such as a transition metal oxide on a first electrode current collector formed of a metal foil made of aluminum. In addition, the first electrode plate 110 includes a first electrode uncoated portion 111 that has no first electrode active material coated thereon. The first electrode uncoated portion 111 becomes a path of the flow of current between the first electrode plate 110 and the outside of the first electrode plate 110. However, aspects of the present invention are not limited to the materials of the first electrode plate 110 disclosed herein.

The second electrode plate 120 is formed by coating a second electrode active material such as a transition metal oxide on a second electrode current collector formed of a metal foil made of made of nickel or copper, and includes a second electrode uncoated portion 121 that has no second electrode active material coated thereon. The second electrode uncoated portion 121 becomes a path of the flow of current between the second electrode plate 120 and the outside of the second electrode plate 120. However, aspects of the present invention are not limited to the materials of the second electrode plate 120 disclosed herein.

Here, the first electrode plate 110 may serve as a positive electrode and the second electrode plate 120 may serve as a negative electrode. In addition, polarities of the first electrode plate 110 and the second electrode plate 120 may be reversed.

The separator 130 is positioned between the first electrode plate 110 and the second electrode plate 120 to prevent an electric short circuit therebetween and to allow lithium ions to move. The separator 130 may be made of polyethylene, polypropylene or a composite film thereof. However, aspects of the present invention are not limited to the materials of the separator 130 disclosed herein.

The electrode assembly 100 is housed in the case 400 together with an electrolyte. The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$, or $LiBF_4$. In addition, the electrolyte may be in a liquid, solid or gel phase.

The first current collector plate 200 includes a first connection part 210, a first extension part 230 and a first terminal hole 240. The first current collector plate 200 is made of a conductive material such as aluminum. In addition, the first current collector plate 200 is coupled to a first electrode uncoated region 111 protruding toward one end of the electrode assembly 100 to then be electrically connected to the first electrode plate 110. The first connection part 210 is formed between a top portion of the electrode assembly 100 and a lower portion of the cap assembly 500. In addition, the first connection part 210 is formed in a plate shape.

The first extension part 230 is bent from an end toward one end C of the first connection part 210, that is, toward the outside of the case 400 to then extend downward with respect to the case 400. The first terminal hole 240 is formed to pass through the first connection part 210 in a thickness direction of the first connection part 210. In addition, the first terminal hole 240 allows a first electrode terminal 520 described later to be inserted thereinto and coupled to the first connection part 210.

The second current collector plate 300 includes a second connection part 310, a second extension part 330 and a second terminal hole 340. The second current collector plate 300 is made of a conductive material such as nickel or copper. In addition, the second current collector plate 300 is coupled to a second electrode uncoated region 121 protruding toward the other end of the electrode assembly 100, thereby being electrically connected to the second electrode plate 120. Meanwhile, the second current collector plate 300 is formed to face the first current collector plate 200 with the electrode assembly 100 located therebetween.

The second connection part 310 is formed between a top portion of the electrode assembly 100 and a lower portion of the cap assembly 500. In addition, the second connection part 310 is formed in a plate shape.

The second extension part 330 is bent from one end C of the second connection part 210, that is, an end toward the outside of the case 400, to then extend downward along the electrode assembly 110 with respect to the case 400.

The second terminal hole 340 is formed to pass through the second connection part 310 in a thickness direction of the second connection part 310. In addition, the first terminal hole 340 allows a second electrode terminal 530 to be described later to be inserted thereinto and coupled to the second connection part 310.

The case 400 may have a substantially hexahedral shaped box having an opening formed at a top portion. Although the opening is not shown in FIGS. 1 and 2 because the case 400 and the cap assembly 500 are in an assembled state, the peripheral portion of the cap assembly 500 generally corresponds to the top opening of the case 400. The electrode assembly 100, the first current collector 200 and the second current collector 300 can be inserted to be housed in the case 400 through the top opening. The case 400 may be formed of a conductive metal such as aluminum, an aluminum alloy or nickel-plated steel. In addition, the internal surface of the case 400 is insulated so that the electrode assembly 100, the first current collector plate 200 and the second current collector plate 300 can be maintained in an insulated state. Since the case 400 is electrically connected to a cap plate 510 to be described later, it may act as either a positive electrode or a negative electrode.

The cap assembly 500 includes a cap plate 510, first electrode terminal 520, second electrode terminal 530, gaskets 540a and 540b, and nuts 550a and 550b. In addition, the cap assembly 500 may further include lower insulation members 560a and 560b, a vent plate 570, and an electrolyte injection plug 580.

The cap plate 510 includes a reinforcing protrusion part 510a, an electrolyte injection hole 511 and a vent hole 512. The cap plate 510 is sized and shaped to fit the top opening of the case 400. In addition, the edge of the cap plate 510 is welded and coupled to the top opening of the case 400, thereby sealing the top opening of the case 400. The cap plate 510 may be made of the same material as the case 400, which facilitates welding between the cap plate 510 and the case 400.

The reinforcing protrusion part 510a is formed on a top surface of the cap plate 510 in a lengthwise direction of the cap plate 510. The reinforcing protrusion part 510a is formed at a location to protrude from the top surface of the cap plate 510. In addition, the reinforcing protrusion part 510a is formed to have a step extending from the surface of the cap plate 510. Accordingly, a stepped surface 513 is formed on the top surface of the cap plate 510 to extend upward (i.e., away from the electrode assembly) from the top surface the cap plate 510.

The reinforcing protrusion part 510a is formed by stamping the bottom surface of the cap plate 510. Therefore, during the forming of the reinforcing protrusion part 510a, a receiving groove RG1 is formed at the lower portion of the cap plate 510 to generally correspond with the reinforcing protrusion part 510a. A depth of the receiving groove RG1 is the same as a height difference h1 between the top surface periphery of the cap plate 510 and the top surface of the reinforcing protrusion part 510a.

The reinforcing protrusion part 510a formed by stamping effectively reinforces the strength of the cap plate 510. In other words, when the cap plate is a planar plate, it may be more easily deformed by a longitudinal torsion or a lateral pressure applied in a longitudinal direction. However, like the cap plate 510 of the rechargeable battery 1000 according to the illustrated embodiment of the present invention, the cap plate 510 having the reinforcing protrusion part 510a disperses external forces, thereby exhibiting increased strength against the torsion or lateral pressure. This is based on the same principle that creased paper does not fold or bend as easily as a sheet of planar paper. In addition, the reinforcing protrusion part 510a exhibits the highest strength reinforcing effect when a step between the reinforcing protrusion part 510a and the top surface periphery of the cap plate 510 is the steepest. In other words, the strongest plate is provided when the stepped surface 513 is at a right angle between the top surface of the cap plate 510 and the top surface of the reinforcing protrusion part 510a. In addition, since the reinforcing part 510a is formed by stamping, the entire surface area of the cap plate 510 is further increased. Therefore, dispersion and emission of heat applied to the cap plate 510 in the course of welding the cap plate 510 to the case 400 can be facilitated, thereby suppressing the torsion of the cap plate 510 due to heat applied thereto.

The electrolyte injection hole 511 is formed at one side of the cap plate 510 and passes through the cap plate 510 in a thickness direction of the cap plate 510. The electrolyte injection hole 511 serves as a path through which an electrolyte is injected into the case 400 once the top opening of the case 400 is sealed by the cap plate 510.

The vent hole 512 is positioned at approximately the center of the cap plate 510 and is formed to pass through the cap plate 510 in a thickness direction of the cap plate 510. A vent plate 570 to be described later is installed in the vent hole 512.

The first electrode terminal 520 passes through one side of the reinforcing protrusion part 510a of the cap plate 510 and is electrically connected to the first current collector plate 200. The first electrode terminal 520 may be formed in a pillar shape. The first electrode terminal 520 is threaded on the external circumferential surface of an upper pillar exposed upward the cap plate 510, and a flange 521 is formed at a lower pillar positioned under the cap plate 510 to prevent the first electrode terminal 520 from being dislodged from the cap plate 510.

The second electrode terminal 530 passes through the other side of the reinforcing protrusion part 510a of the cap plate 510 and is electrically connected to the second current collector plate 300. The second electrode terminal 530 may be formed in a pillar shape. The second electrode terminal 530 is threaded on the external circumferential surface of an upper pillar exposed upward the cap plate 510, and a flange 531 is formed at a lower pillar positioned under the cap plate 510 to prevent the second electrode terminal 530 from being dislodged from the cap plate 510.

The electrode terminals 520 and 530 serve as paths that electrically connect the positive and negative electrodes of the electrode assembly 100 to external devices.

The gaskets 540a and 540b are formed between the first electrode terminal 510 and the cap plate 510 and between the second electrode terminal 520 and the cap plate 510 and seal regions between each of the electrode terminals 520 and 530 and the cap plate 510. Accordingly, the gaskets 540a and 540b may prevent external moisture from permeating into the rechargeable battery 1000 and may prevent the electrolyte accommodated in the rechargeable battery 1000 from leaking. In addition, the gaskets 540a and 540b are made of an insulating material. Accordingly, the gaskets 540a and 540b may serve to electrically insulate regions between each of the electrode terminals 520 and 530 and the cap plate 510 from each other.

The nuts 550a and 550b are fastened with threads of the first and second first electrode terminals 520 and 530, respectively. Therefore, the nuts 550a and 550b may fix the first and second first electrode terminals 520 and 530 to the cap plate 510, respectively.

The lower insulation members 560a and 560b are formed between the first connection part 210 and the cap plate 510 in the first current collector plate 200 and between the second connection part 310 and the cap plate 510 in the second current collector plate 300. In addition, the lower insulation members 560a and 560b are formed to surround lower pillars of the first and second electrode terminals 520 and 530. Therefore, the lower insulation members 560a and 560b may serve to prevent the connection parts 210 and 310 of the first and second current collector plates 200 and 300 from being short-circuited by the cap plate 510.

The lower pillars of the electrode terminals 520 and 530 and the lower insulation members 560a and 560b are fixed on the bottom surface of the cap plate 510 while being positioned within the receiving groove RG1 formed at the bottom surface of the cap plate 510. The rechargeable battery 1000 according to the illustrated embodiment includes the electrode terminals 520 and 530 and the lower insulation members 560a and 560b located further away from the electrode assembly by a depth h1 of the receiving groove RG1 compared to a rechargeable battery including a plate-shaped cap plate. In other words, the rechargeable battery 1000 allows for an increased depth of the electrode assembly 100, thereby increasing the capacity thereof.

The vent plate 570 is in a vent hole 512 of the cap plate 510 and has a notch 571 configured to be openable at a preset pressure. Thus, when the internal pressure of the rechargeable battery 1000 rises to a level higher than or equal to the preset pressure, the notch 571 is ruptured and the internal gas of the rechargeable battery 1000 is released, thereby securing the safety of the rechargeable battery 1000.

The electrolyte injection plug 580 seals the electrolyte injection hole 511 of the cap plate 510 once the top opening of the case 400 is sealed by the cap plate 510.

As described above, the rechargeable battery 1000 according to the illustrated embodiment of the present invention has enhanced strength against torsion or lateral pressure by the reinforcing protrusion part 510a formed by stamping. In addition, since the illustrated rechargeable battery 1000 has an increased height of the electrode assembly 100 by about the depth h1 of the receiving groove RG1 formed at the bottom surface of the cap plate 510, the capacity thereof can be enhanced.

Figure 3:
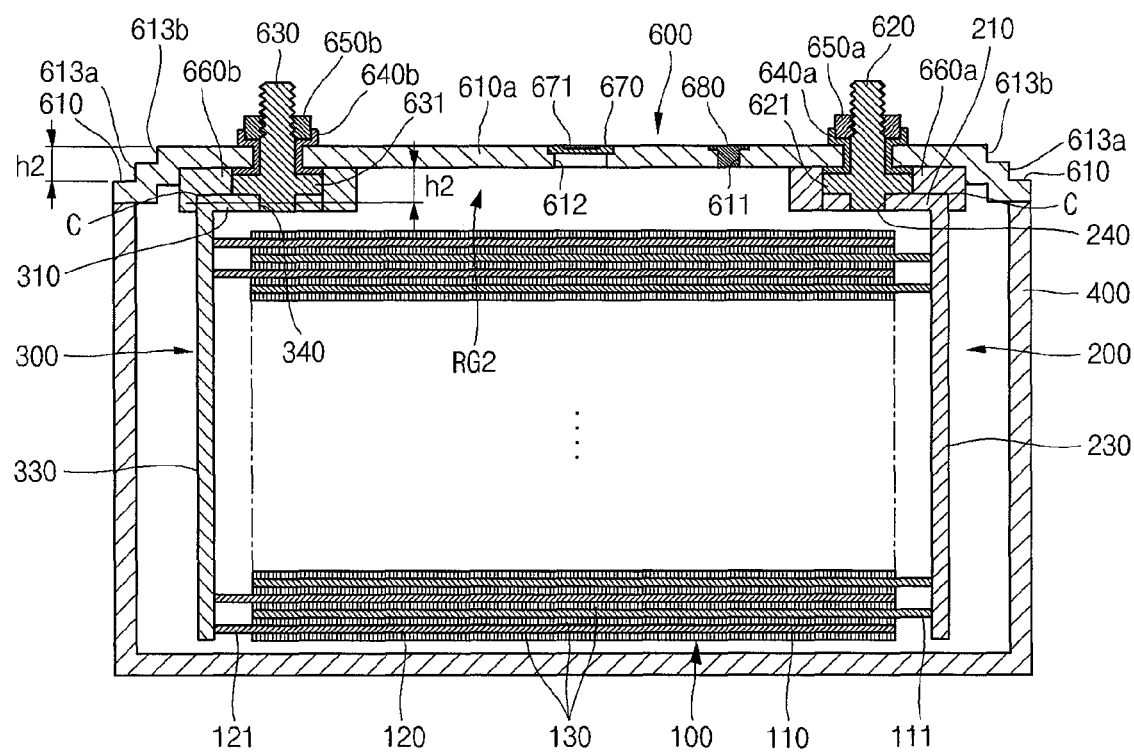
FIG. 3 is a cross-sectional view of a rechargeable battery according to another embodiment of the present invention.

A rechargeable battery 1000a according to another embodiment of the present invention will now be described with reference to FIG. 3. FIG. 3 is a cross-sectional view of a rechargeable battery according to another embodiment of the present invention.

The illustrated rechargeable battery 1000a is substantially the same as the rechargeable battery according to the previous embodiment in view of components and functions, except for a configuration of a cap plate 610 of a cap assembly 600. Accordingly, in the following description of the illustrated rechargeable battery 1000a will focus on the configuration of the cap plate 610 of the cap assembly 600, and repeated descriptions will not be given.

Referring to FIG. 3, in the rechargeable battery 1000a according to the illustrated embodiment, the cap assembly 600 includes a cap plate 610, a first electrode terminal 620, a second electrode terminal 630, gaskets 640a and 640b, and nuts 650a and 650b. In addition, the cap assembly 600 may further include lower insulation members 660a and 660b, a vent plate 670 and an electrolyte injection plug 680. In addition, the cap plate 610 includes a reinforcing protrusion part 610a, an electrolyte injection hole 611 and a vent hole 612.

The reinforcing protrusion part 610a is formed on a top surface of the cap plate 610 in a lengthwise direction of the cap plate 610. The reinforcing protrusion part 610a is formed to protrude from a periphery of the top surface of the cap plate 610. In addition, the reinforcing protrusion part 610a has a plurality of steps extending from the top surface of the cap plate 610. Accordingly, a first stepped surface 613a is formed to extend upward (i.e., away from the electrode assembly 110) from the top surface of the cap plate 610 and a second stepped surface 613b is formed extending from a top end of the first stepped surface 613a. A top end of the second stepped surface 613b meets at either edge of the top surface of the reinforcing protrusion part 610a. Although FIG. 3 illustrates the rechargeable battery 1000a having two steps, aspects of the present invention are not limited thereto and there may include three or more steps.

The reinforcing protrusion part 610a is formed by stamping the bottom surface of the cap plate 610. Therefore, during the forming of the reinforcing protrusion part 610a, a receiving groove RG2 is formed at the lower portion of the cap plate 610 to be shaped to fit the reinforcing protrusion part 610a. A depth of the receiving groove RG2 is the same as a height difference h2 between the top surface periphery of the cap plate 610 and the top surface of the reinforcing protrusion part 610a.

The plurality of steps formed by stamping may disperse external forces more efficiently compared to a single step, thereby effectively enhancing the strength of the cap plate 610. In addition, the reinforcing protrusion part 610a exhibits the highest strength reinforcing effect in a case where the plurality of steps between the reinforcing protrusion part 610a and the top surfaces of the periphery of the cap plate 610 are perpendicularly formed. In other words, the strongest plate is formed when the first stepped surface 613a and the second stepped surface 613b are formed at right angles with respect to the top surface of the cap plate 610 and the top surface of the reinforcing protrusion part 610a.

In addition, the entire surface area of the cap plate 610 of the illustrated rechargeable battery 1000a is further increased, compared to a cap plate 510 having a single step. Therefore, dispersion and emission of heat applied to the cap plate 610 in the course of welding the cap plate 610 to the case 400 can be facilitated, thereby suppressing the torsion of the cap plate 610 due to heat applied thereto.

Figure 4:
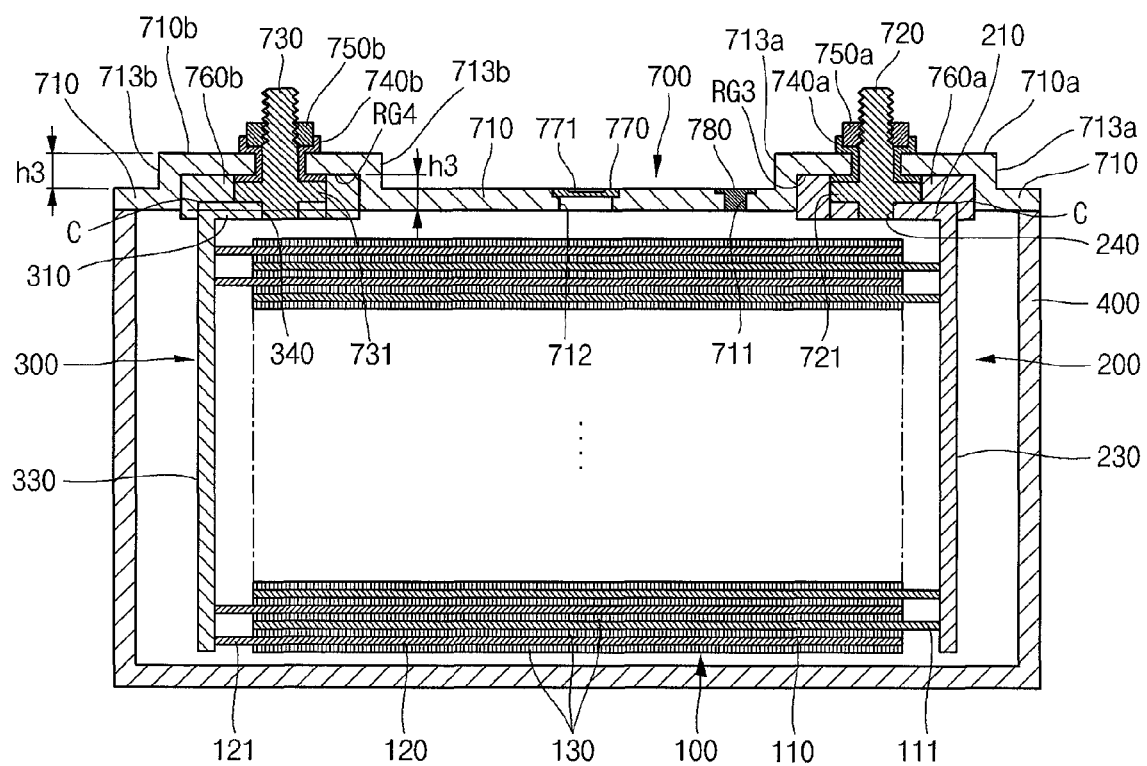
FIG. 4 is a cross-sectional view of a rechargeable battery according to still another embodiment of the present invention.

A rechargeable battery 1000b according to still another embodiment of the present invention will now be described with reference to FIG. 4. FIG. 4 is a cross-sectional view of a rechargeable battery according to still another embodiment of the present invention. The illustrated rechargeable battery 1000b is substantially the same as the rechargeable batteries 1000 and 1000a according to the previous embodiments in view of components and functions, except for a configuration of a cap plate 710 of a cap assembly 700. Accordingly, in the following description of the illustrated rechargeable battery 1000b will focus on the configuration of the cap plate 710 of the cap assembly 700, and repeated descriptions will not be given.

Referring to FIG. 4, the cap assembly 700 of the illustrated rechargeable battery 1000b includes a cap plate 710, a first electrode terminal 720, a second electrode terminal 730, gaskets 740a and 740b, and nuts 750a and 750b. In addition, the cap assembly 700 may further include lower insulation members 760a and 760b, a vent plate 770 and an electrolyte injection plug 780. In addition, the cap plate 710 includes a first reinforcing protrusion part 710a, a second reinforcing protrusion part 710b, an electrolyte injection hole 711 and a vent hole 712.

The first reinforcing protrusion part 710a is formed on a top surface of one side of the cap plate 710 in a lengthwise direction of the cap plate 710. The reinforcing protrusion part 710a is formed to protrude from the top surface periphery of the cap plate 710. In addition, the first reinforcing protrusion part 710a is formed to have a step upward (i.e., away from the electrode assembly 110) from the top surface of the cap plate 710. Accordingly, a stepped surface 713a is formed to extend towards the first electrode terminal 720 from the top surface periphery of the cap plate 710. Although FIG. 4 illustrates the rechargeable battery 1000b having a single step, aspects of the present invention are not limited thereto and there may be two or more steps formed, like in the rechargeable battery 1000a according to the previous embodiment shown in FIG. 3.

The first reinforcing protrusion part 710a is formed by stamping the bottom surface of the cap plate 710. Therefore, during the forming of the reinforcing protrusion part 710a, a receiving groove RG3 is formed at the lower portion of the cap plate 710 to be shaped to fit the reinforcing protrusion part 710a. A depth of the receiving groove RG3 is the same as a height difference h3 between the top surface periphery of the one side of the cap plate 710 and the top surface of the reinforcing protrusion part 710a. In addition, a lower pillar of the first electrode terminal 720 and the lower insulation member 760a are positioned within the first receiving groove RG3.

The second reinforcing protrusion part 710b is formed on a top surface of the other side of the cap plate 710 in a lengthwise direction of the cap plate 710. The second reinforcing protrusion part 710b is formed to protrude toward the second electrode terminal 730 from the top surface periphery of the cap plate 710. In addition, the second reinforcing protrusion part 710b is formed to have a step upward from the top surface of the cap plate 710. Accordingly, a stepped surface 713b is formed to extend upward from the top surface of the cap plate 710. Although FIG. 4 illustrates the rechargeable battery 1000b having a single step, aspects of the present invention are not limited thereto and there may be two or more steps formed, like in the rechargeable battery 1000a according to the previous embodiment shown in FIG. 3.

The second reinforcing protrusion part 710b is formed by stamping the bottom surface of the cap plate 710. Therefore, during the forming of the second reinforcing protrusion part 710b, a receiving groove RG4 is formed at the lower portion of the cap plate 710 to be shaped to fit the second reinforcing protrusion part 710b. A depth of the receiving groove RG4 is the same as a height difference h3 between the top surface periphery of the other side of the cap plate 710 and the top surface of the second reinforcing protrusion part 710b. In addition, a lower pillar of the second electrode terminal 730 and the lower insulation member 760b are positioned within the second receiving groove RG4.

When the first and second reinforcing protrusion parts 710a and 710b are separately formed at either side of the cap plate 710, respectively, like in the illustrated rechargeable battery 1000c, the strength of the cap plate 710 is further enhanced, compared to a case where a reinforcing protrusion part is continuously formed from one side to the other side of the cap plate 700. In other words, the rechargeable battery 1000c includes stepped surfaces 713a and 713b further provided between the first electrode terminal 720 and the second electrode terminal 730, thereby dispersing external forces more efficiently. In addition, the first and second reinforcing protrusion parts 710a and 710b exhibit the highest strength reinforcing effect in a case where the step between each of the first and second reinforcing protrusion parts 710a and 710b and the top surfaces of the periphery of the cap plate 710 are perpendicularly formed, i.e., when the first stepped surface 713a and the second stepped surface 713b are formed at right angle with respect to the top surface of the cap plate 710 and the top surface of the first and second reinforcing protrusion parts 710a and 710b.

In addition, the entire surface area of the cap plate 710 of the illustrated rechargeable battery 1000c is further increased, compared to a case of the cap plate 710 having a continuous step formed from one side to the other side of the cap plate 710. Therefore, dispersion and emission of heat applied to the cap plate 710 in the course of welding the cap plate 710 to the case 400 can be facilitated, thereby suppressing the torsion of the cap plate 710 due to heat applied thereto.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims.

What is claimed is:

1. A rechargeable battery comprising:
   an electrode assembly including a first electrode plate, a second electrode plate, and a separator between the first and second electrode plates;
   a first collector plate and a second collector plate electrically coupled to the first electrode plate and the second electrode plate, respectively;
   a case accommodating the electrode assembly and the first and second collector plates; and
   a cap assembly coupled to the case, wherein the cap assembly comprises:
   a cap plate sealing the case and having a vent hole, the cap plate comprising a peripheral surface and a reinforcing protrusion part central with respect to the peripheral surface extending along a length of the cap date and protruding away from the electrode assembly in a direction perpendicular to a width of the cap plate such that a receiving groove is located directly between the reinforcing protrusion part an the electrode assembly;
   a vent plate separate from the cap plate within the vent hole; and
   a first electrode terminal and a second electrode terminal penetrating the cap plate,
   wherein the vent plate, the first electrode terminal and the second electrode terminal are located in the reinforcing protrusion part.

2. The rechargeable battery of claim 1, wherein the reinforcing protrusion part is stepped from a peripheral surface of the cap plate.

3. The rechargeable battery of claim 2, wherein the step includes a plurality of steps.

4. The rechargeable battery of claim 1, wherein a stepped surface forming a lateral surface of the reinforcing protrusion part is substantially perpendicular to the peripheral surface of the cap plate.

5. The rechargeable battery of claim 1, wherein the receiving groove located opposite to the reinforcing protrusion part.

6. The rechargeable battery of claim 1, wherein the first electrode terminal is within a first side of the receiving groove and wherein the second electrode terminal is within a second side of the receiving groove.

7. The rechargeable battery of claim 6, wherein the first collector plate and the second collector plate each comprise a connection part coupled to the first electrode terminal and the second electrode terminal, respectively, and an extension part bent from one end of the connection part and extending along a side of the electrode assembly, and wherein the electrode assembly is coupled to the extension part of the first and second collector plates.

* * * * *